United States Patent
Lee et al.

(10) Patent No.: US 11,643,200 B2
(45) Date of Patent: May 9, 2023

(54) VERTICAL TAKEOFF AND LANDING AIR MOBILITY

(71) Applicants: Hyundai Motor Company, Seoul (KR); Kia Motors Corporation, Seoul (KR)

(72) Inventors: Keun Seok Lee, Gyeonggi-do (KR); Hyun Woo Jun, Seoul (KR); Se Hwan Park, Gyeonggi-do (KR); Jae Hyung Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 228 days.

(21) Appl. No.: 17/014,702

(22) Filed: Sep. 8, 2020

(65) Prior Publication Data

US 2021/0206483 A1 Jul. 8, 2021

(30) Foreign Application Priority Data

Jan. 3, 2020 (KR) .......................... 10-2020-0001066

(51) Int. Cl.
*B64C 29/00* (2006.01)
*B64C 1/14* (2006.01)
*B64D 9/00* (2006.01)

(52) U.S. Cl.
CPC ........ *B64C 29/0033* (2013.01); *B64C 1/1423* (2013.01); *B64C 29/0025* (2013.01); *B64D 9/00* (2013.01)

(58) Field of Classification Search
CPC ............ B64C 29/0016; B64C 29/0025; B64C 29/0033
See application file for complete search history.

(56) References Cited

U.S. PATENT DOCUMENTS

| 10,981,650 | B2 * | 4/2021 | Fink ...................... B64C 39/068 |
| 2018/0334251 | A1 | 11/2018 | Karem et al. |
| 2019/0263515 | A1 | 8/2019 | Karem et al. |
| 2020/0269975 | A1 * | 8/2020 | Fink ........................ B64C 27/26 |
| 2021/0362849 | A1 * | 11/2021 | Bower .................... B64C 27/28 |
| 2021/0403154 | A1 * | 12/2021 | Tighe ..................... B64D 27/24 |
| 2022/0009626 | A1 * | 1/2022 | Baharav .................. B64C 27/26 |
| 2022/0161927 | A1 * | 5/2022 | Moore ...................... B64C 9/18 |
| 2022/0177145 | A1 * | 6/2022 | Melack .................. H02H 7/268 |

* cited by examiner

*Primary Examiner* — Richard Green
*Assistant Examiner* — Madison Elizabeth Dittner
(74) *Attorney, Agent, or Firm* — Fox Rothschild LLP

(57) ABSTRACT

An air mobility craft is provided. The air mobility craft includes a fuselage that has a boarding space and a boarding gate and a plurality of wings disposed on the fuselage. A plurality of rotors are disposed on the wings. A first number of the plurality of rotors are tilting rotors configured to tilt upward or downward for lifting or cruising of the fuselage and a remaining number of the rotors are lifting rotors.

15 Claims, 6 Drawing Sheets

VERTICAL TAKEOFF AND LANDING AIR MOBILITY

CROSS REFERENCE TO RELATED APPLICATION

The present application claims priority to Korean Patent Application No. 10-2020-0001066, filed Jan. 3, 2020, the entire contents of which is incorporated herein for all purposes by this reference.

BACKGROUND

Field of the Disclosure

The present disclosure relates to vertical takeoff and landing air mobility which is capable of taking off and landing vertically, and by effectively disposing a plurality of rotors, the vertical takeoff and landing air mobility is capable of responding to a failure of some rotors, effectively reducing noise and/or vibration, and increasing boarding convenience.

Description of the Related Art

Recently, there is growing interest in air mobility due to environmental pollution and traffic congestion in urban areas. Air mobility has been highlighted as an effective means of transportation to resolve traffic congestion and reduce environmental pollution of the city. Since such air mobility should be able to allow an individual or a plurality of passengers to be on board and to take off and land in urban areas, air mobility should be equipped with a vertical takeoff and landing function, entering and exiting should be favorable for convenience of the passengers, and a design for air mobility should be in consideration of noise and vibration according to the operation of rotors.

In particular, since passenger safety should be ensured, even when some rotors fail, a technical solution that makes a continued flight possible in spite of the failure by the rest of the rotors should be provided. However, in conventional air mobility technologies, when some of rotors fail, flight balance is structurally difficult to achieve due to a limited number of rotors. In addition, there is another problem in that an issue regarding entering and exiting and noise and/or vibration is not considered at all.

The foregoing is intended merely to aid in the understanding of the background of the present disclosure, and is not intended to mean that the present disclosure falls within the purview of the related art that is already known to those skilled in the art.

SUMMARY

The present disclosure provides vertical takeoff and landing air mobility by effectively disposing a plurality of rotors to response to a failure of some rotors, reduce noise and/or vibration, and increase boarding convenience.

In order to achieve the objective of the present disclosure, a vertical takeoff and landing air mobility system may include: a fuselage provided with a boarding space and a boarding gate; wings disposed on the fuselage; and a rotor including a plurality of rotors disposed on the wings. Some of the plurality of rotors may be tilting rotors configured to tilt upward or downward for lifting or cruising of the fuselage, and a remaining of the rotors except for the tilting rotors may be lifting rotors for the lifting of the fuselage. The tilting rotors may include at least four or more rotors, at least two or more tilting rotors being respectively disposed on a left side and a right side relative to a center of the fuselage, and the lifting rotors may include two or more rotors, whereby, even when some of the rotors fail, a flight control may be performed stably by the remaining rotors.

The tilting rotors may include an even number of rotors, and a same number thereof may be respectively disposed on the left side and the right side relative to the center of the fuselage. The lifting rotors may include at least four or more rotors, and at least two or more lifting rotors may be respectively disposed on the left side and the right side relative to the center of the fuselage. Additionally, the tilting rotors may include close tilting rotors disposed in close proximity to the fuselage, and distant tilting rotors disposed to be distant from the fuselage, and the close tilting rotors may be disposed at positions upwardly apart from the fuselage.

At least one or more rotors among the lifting rotors may be a two-lobed propeller type. The lifting rotors may be stopped to maximally reduce flight resistance when not in operation. The lifting rotors may be stopped to maximally reduce the flight resistance during the cruising. In addition, the lifting rotors may be stopped to maximally reduce the flight resistance when not in operation, and may be aligned in a direction parallel to a flight direction. In a case of the two-lobed propeller type of the lifting rotors, two propellers may be provided, a first as an upper part propeller and a second as a lower part propeller.

The wings may include a main wing and a tail wing, and the rotor may be disposed on the main wing and the tail wing. The main wing may include two tilting rotors and two or more lifting rotors, and the tilting rotors may be disposed at both of outermost sides of the main wing. Alternatively, the main wing may include two tilting rotors and four lifting rotors, and the two tilting rotors and two lifting rotors may be disposed at a front side of the main wing, and other two lifting rotors may be disposed at a rear side of the main wing.

The two tilting rotors and the two lifting rotors disposed on the rear side of the main wing may be disposed on both of outermost sides of the main wing. The tail wing may include two tilting rotors. The two tilting rotors disposed on the tail wing may be disposed at positions upwardly apart from the fuselage. The tail wing may extend upwardly inclined from an upper part of the fuselage and the tilting rotors may be disposed on outermost sides of the tail wing.

The wings may include a main wing and a tail wing which may be shorter in length than the main wing, wherein two tilting rotors and two lifting rotors may be disposed to be horizontally aligned in front of the main wing, two lifting rotors may be disposed at a rear of the main wing, and two tilting rotors may be disposed on the tail wing. The lifting rotors at the rear of the main wing and the tilting rotors of the tail wing may be disposed to be horizontally aligned. The tilting rotors of the main wing may be disposed on outermost sides of the main wing, and the tilting rotors of the tail wing may be disposed at positions between the fuselage and the lifting rotors on the rear of the main wing.

The lifting rotors may include close lifting rotors disposed in close proximity to the fuselage and distant lifting rotors disposed to be distant from the fuselage. The close lifting rotors may include propellers inclined so that a side of the close lifting rotors close to the fuselage may face upward. The boarding gate may be disposed on a side of the fuselage, and may form a closed space for passengers to reach the boarding gate through a lower space of the lifting rotors disposed proximate to the fuselage and the tilting rotors.

According to the vertical takeoff and landing air mobility of the present disclosure, the vertical takeoff and landing air mobility is capable of taking off and landing vertically, and by effectively disposing a plurality of rotors, the vertical takeoff and landing air mobility may respond to a failure of some rotors, effectively reduce noise and/or vibration, and increase boarding convenience.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

DETAILED DESCRIPTION

Figure 1:
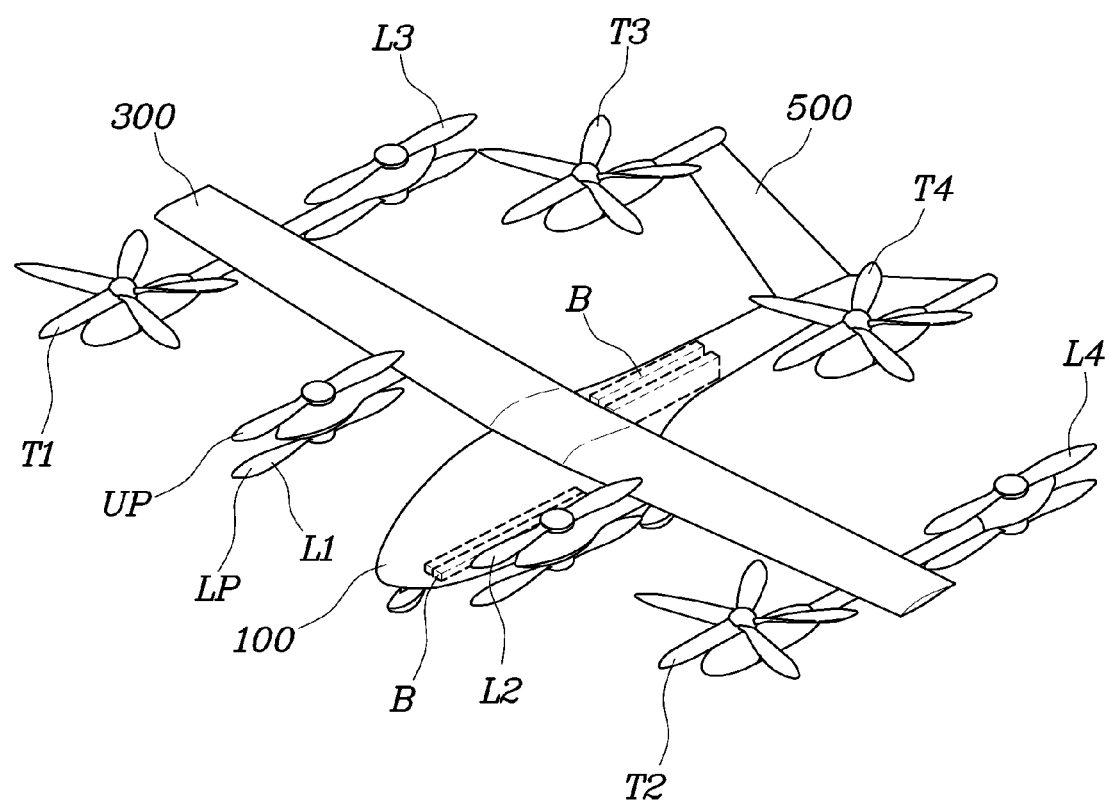
FIG. 1 is a perspective view showing vertical takeoff and landing air mobility according to an exemplary embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, unmanned air mobility crafts, and the like, and includes hybrid vehicles, electric vehicles, combustion, plug-in hybrid electric vehicles, hydrogen-powered vehicles and other alternative fuel vehicles (e.g. fuels derived from resources other than petroleum).

The vertical takeoff and landing air mobility of the present disclosure is and Urban Air Mobility (UAM) that may be utilized by an individual or a plurality of passengers in urban areas, and this concept is not limited to UAM, but includes various manned and/or unmanned aircrafts including drones and the like, which require vertical taking off and landing and is also not limited to urban areas. A representative exemplary embodiment of the present disclosure deals with UAM among these aircrafts. As for the air mobility for UAM, a disposition and a design of rotors are important because entering and exiting the UAM craft or vehicle should be quick and easy in urban areas. In addition, passengers need a comfortable ride, and thus, a design for reducing noise and vibration is necessary, and the air mobility should be provided with a vertical takeoff and landing function to take off and land in urban areas.

In particular, since a large number of passengers frequently use air mobility, there is also a need to prevent accidents. Accordingly, the air mobility is provided with a plurality of rotors, wherein, when some of the plurality of rotors fail, flight balance is controllable by the rest of the normally operating rotors to ensure that the air mobility arrives safely to a destination or a maintenance service station, carrying out a maintenance work afterward, and thus passenger safety is ensured.

Figure 2:
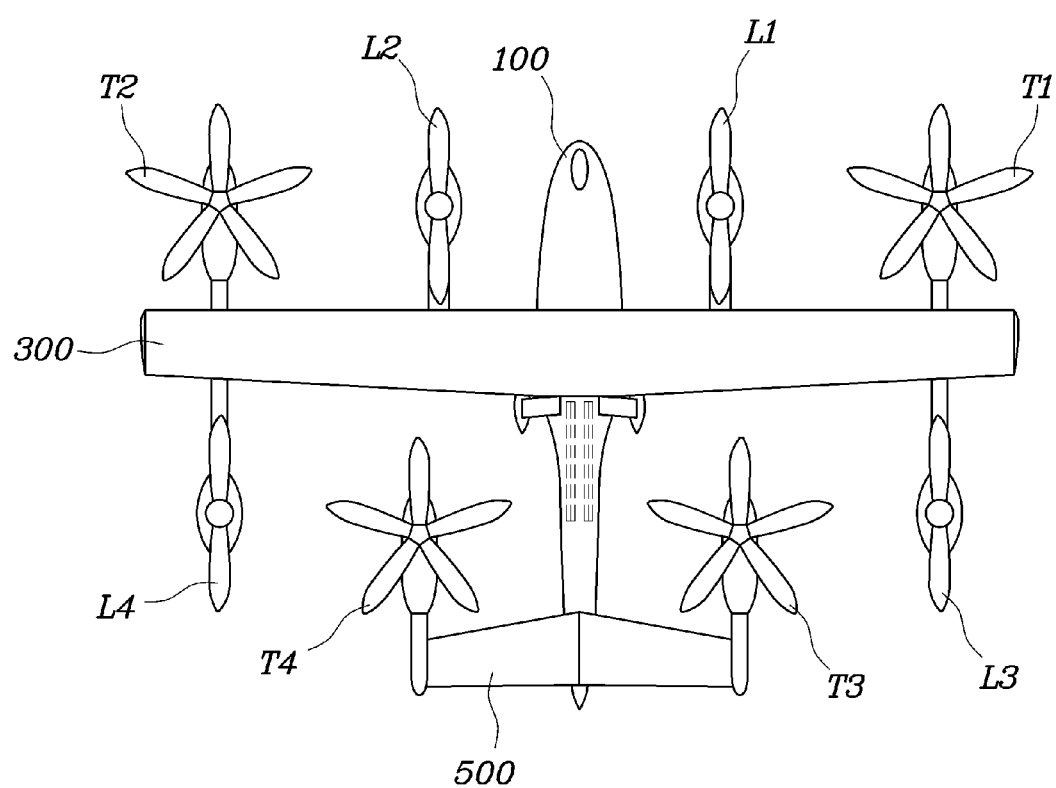
FIG. 2 is a plan view showing a lifting state of the takeoff and landing air mobility according to the exemplary embodiment of the present disclosure.
Figure 3:
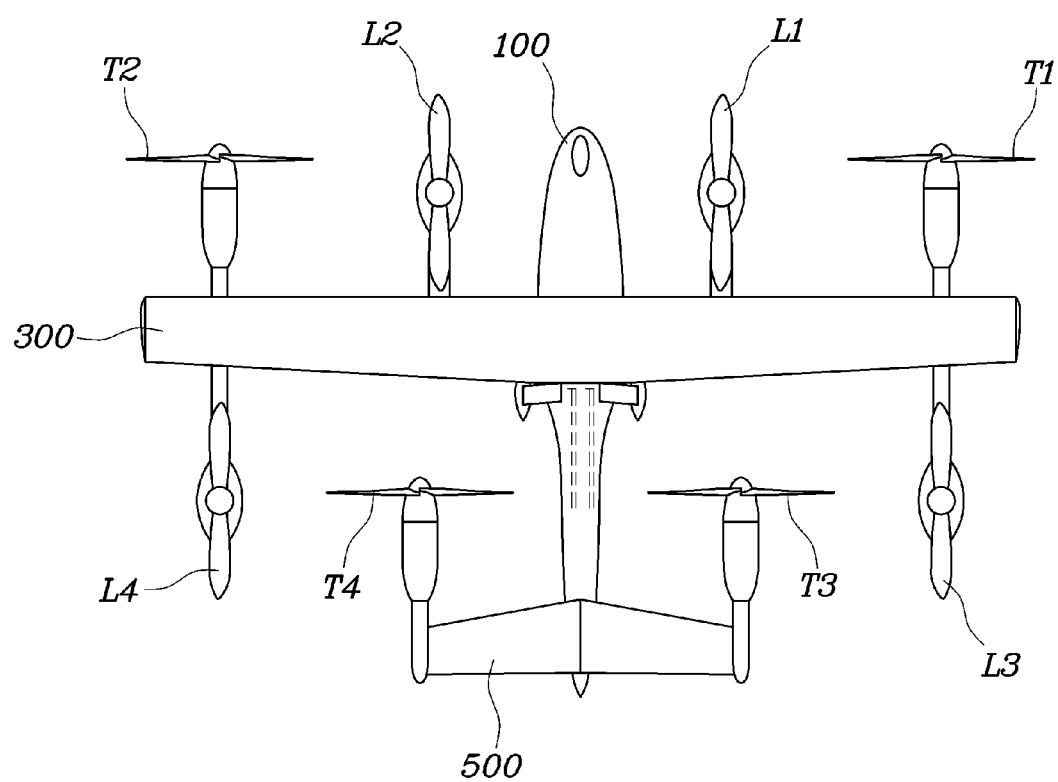
FIG. 3 is a plan view showing a cruising state of the vertical takeoff and landing air mobility according to the exemplary embodiment of the present disclosure.
Figure 4:
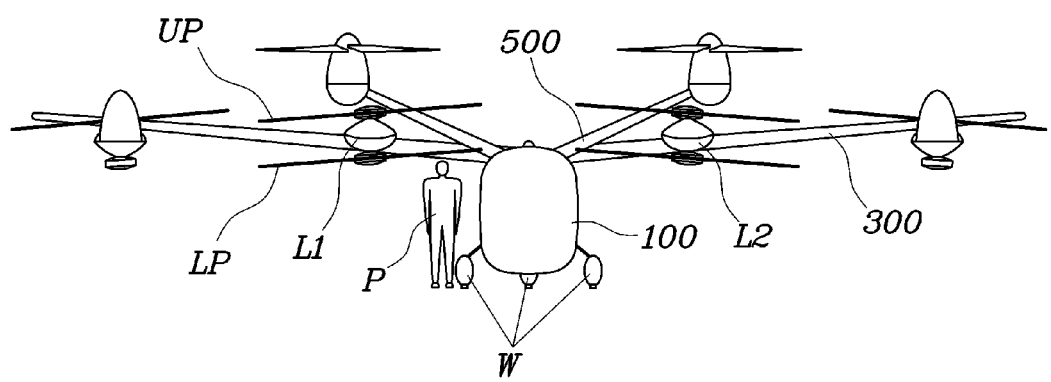
FIG. 4 is a front view showing the lifting state of the takeoff and landing air mobility according to the exemplary embodiment of the present disclosure.

The objective of the present disclosure is to provide the air mobility vehicle with such a multi-purpose function. FIG. 1 is a perspective view showing vertical takeoff and landing air mobility according to an exemplary embodiment of the present disclosure, FIG. 2 is a plan view showing a lifting state of the takeoff and landing air mobility according to the exemplary embodiment of the present disclosure, FIG. 3 is a plan view showing a cruising state of the vertical takeoff and landing air mobility according to the exemplary embodiment of the present disclosure, and FIG. 4 is a front view showing the lifting state of the takeoff and landing air mobility according to the exemplary embodiment of the present disclosure.

The vertical takeoff and landing air mobility craft according to the present disclosure may include: a fuselage 100 having a boarding space and a boarding gate; wings 300 and 500 disposed on the fuselage 100; and a rotor unit T1 to T4 and L1 to L4 including a plurality of rotors disposed on the wings 300 and 500. Some of the plurality of rotors may be tilting rotors T1 to T4 configured to tilt upward or downward for lifting or cruising of the fuselage 100, and the remaining rotors except for the tilting rotors T1 to T4 may be lifting rotors L1 to L4. The tilting rotors T1 to T4 may include at least four or more rotors, at least two or more of the tilting rotors may be respectively disposed on the left side and the right side relative to the center of the fuselage, and the lifting rotors L1 to L4 may include two or more rotors. Accordingly, even when some of the rotors fail, a flight control may be performed stably by the remaining rotors.

As shown, the air mobility craft of the present disclosure may include the fuselage 100, and the wings 300 and 500, and a plurality of passengers may be on board in the fuselage 100. In the illustrated exemplary embodiment, a total of four passengers excluding a driver are able to occupy the space within the craft. In addition, a number of rotors may be provided for vertical taking off and landing and horizontal cruising. As for the rotors, some of the plurality of rotors may be tilting rotors T1 to T4 configured to tilt upward or downward for lifting or cruising of the fuselage, and the remaining rotors except for the tilting rotors may be lifting rotors L1 to L4 for lifting of the fuselage 100.

The air mobility craft of the present disclosure may be a distributed electric propulsion (DEP) electric vertical takeoff and landing (eVTOL) using electric power, and is serviceable when applied to an electric power vertical takeoff and landing aircraft. In addition, each of the rotors may be driven by a single or a plurality of electric motors. As shown in FIG. 1, for supplying electrical energy to the one or more electric motors, the air mobility craft may be equipped with batteries B in a lower part of the fuselage and/or in a lower part of the boarding seats in the fuselage, and/or in an extension part that extends rearward from the fuselage to a tail wing, but the present disclosure is not limited thereto.

In addition, independently driven wheels W may be provided at the lower part of the fuselage as shown in FIG. 4 to support the fuselage and to move the fuselage on the ground at a boarding stop. Each wheel W may include an independent motor to move the fuselage on the ground as if the fuselage were a vehicle. At the boarding stop, since moving the fuselage by driving the rotors is problematic in view of safety, the independent wheels are required to park, leave, or move the air mobility craft as described above.

Further, application of a five-lobed propeller type to the tilting rotors T1 to T4 may be preferable to provide sufficient propulsion force during cruising. In addition to components rotating the propellers, the tilting rotors T1 to T4 may be respectively provided with an actuator separately for tilting the rotors itself, and various means are known about such a tilting actuator, and thus detailed description thereof will be omitted.

As for the tilting rotors T1 to T4, when being tilted upward, the tilting rotors T1 to T4 are about level to the ground and may be configured to perform a lifting function together with the lifting rotors L1 to L4. In addition, when the tilting rotors T1 to T4 are tilted downward from that horizontal state, the tilting rotors may be adjusted to face the front of the fuselage to generate propulsion force during flying or cruising of the fuselage. In addition, during the flight, the fuselage 100 may be configured to generate lift using the tilting rotors T1 to T4, and as necessary, the tilting rotors may also be operated together with the lifting rotors L1 to L4 to reinforce lift. Such a scenario may be illustrated in a case where the fuselage is not fast enough before and after takeoff and landing so that sufficient lift is not secured.

When capacity or power of the tilting rotors T1 to T4 is increased for lifting, excessive noise and/or vibration caused by the tilting rotors T1 to T4 may occur during cruising thereafter. Thus, the capacity and power of the tilting rotors T1 to T4 should be maximally reduced only to the extent for lifting and cruising, and the lifting rotors L1 to L4 may be provided separately to handle the generation of sufficient lift when lifting.

In this regard, a 6+2 structure is proposed in which, among the wings, six rotors are disposed on the main wing 300 and two rotors are disposed on the tail wing 500. In addition, as for the six rotors mounted on the main wing 300, four rotors may be the lifting rotors L1 to L4 and two rotors may be the tilting rotors T1 and T2 to maximally reduce noise and/or vibration, generated during cruising, at the main wing 300 close or proximate to the boarding space. The remaining two tilting rotors T3 and T4 may be installed on the tail wing 500 distant from the boarding space.

The tilting rotors T1 to T4 may include an even number of rotors, and the same number of the tilting rotors may be respectively disposed on the left side and the right side relative to the center of the fuselage. In other words, ordinarily, to perform normal balance control, the tilting rotors are provided in an even number, and the same number of the tilting rotors T1 to T4 are disposed on both left and right sides.

In addition, the lifting rotors L1 to L4 may include at least four or more rotors L1, L2, L3, and L4 as shown in the drawing, and at least two or more lifting rotors may be respectively disposed on the left side and the right side relative to the center of the fuselage 100. The lifting rotors L1 to L4 are also favorable in terms of balance control when provided in an even number. When any one of the tilting rotors T1 to T4 and the lifting rotors L1 to L4 fails, performing the balance control at the time of lifting is possible by the remaining lifting rotors and tilting rotors. Therefore, when lifting is necessary, such as during hovering or in a transition stage, sufficient lift is provided to allow for the balance control of the fuselage and control in an emergency situation.

Meanwhile, the tilting rotors T1 to T4 may include close tilting rotors T3 and T4, which are disposed in close proximity to the fuselage 100, and distant tilting rotors T1 and T2, which are disposed distant from the fuselage 100. The close tilting rotors T3 and T4 may be disposed at positions upwardly apart from the fuselage 100.

This case may be understandable with reference to FIGS. 2 and 4. In the case of the exemplary embodiment, a total of four tilting rotors T1 to T4 are provided, two of which are provided on the main wing 300, and two of which are provided on the tail wing 500. In the case of being provided in the main wing 300, when the tilting rotors are disposed close or proximate to the fuselage 100, the tilting rotors cause a continuous noise and/or vibration during cruising, thereby being adverse in terms of noise, vibration, and harshness (NVH) and reducing ride quality. Therefore, when the tilting rotors T1 and T2 are installed on the main wing 300, the tilting rotors T1 and T2 may be disposed away from the fuselage 100 as much as possible.

Two tilting rotors T3 and T4 may also be disposed on the tail wing 500. In particular, since the tail wing 500 has a shorter length than the main wing 300, even though the tilting rotors T3 and T4 are disposed at the ends of the tail wing 500, the tilting rotors T3 and T4 may be in close proximity to some extent to the fuselage 100 (e.g., proximate to). Accordingly, the tilting rotors T3 and T4 may be disposed at positions above the fuselage 100 to maximally reduce impact due to noise and/or vibration.

In addition, as for the rotors disposed close to the fuselage 100, inconvenience or a safety concern such as hitting the head occurs when passengers get on and off (e.g., enters and exits) the fuselage. By disposing the tilting rotors T3 and T4, which are close to the fuselage 100, at positions in the upward direction as much as possible (e.g., as high up as possible), the tilting rotors T3 and T4 may be positioned above passengers to form a sufficient space for entering and exiting as shown in FIG. 4. Accordingly, by installing the main wing 300 on the upper end of the fuselage to increase the height, the position of the lifting rotors L1 and L2, which are installed thereon, may be high enough to prevent any collision with a passenger. In addition, by disposing the tilting rotors T3 and T4 on the tail wing 500 and tilting the tilting rotors T3 and T4 upward when passengers enter and exit, a sufficient space for entering and exiting may be provided.

Figure 5:
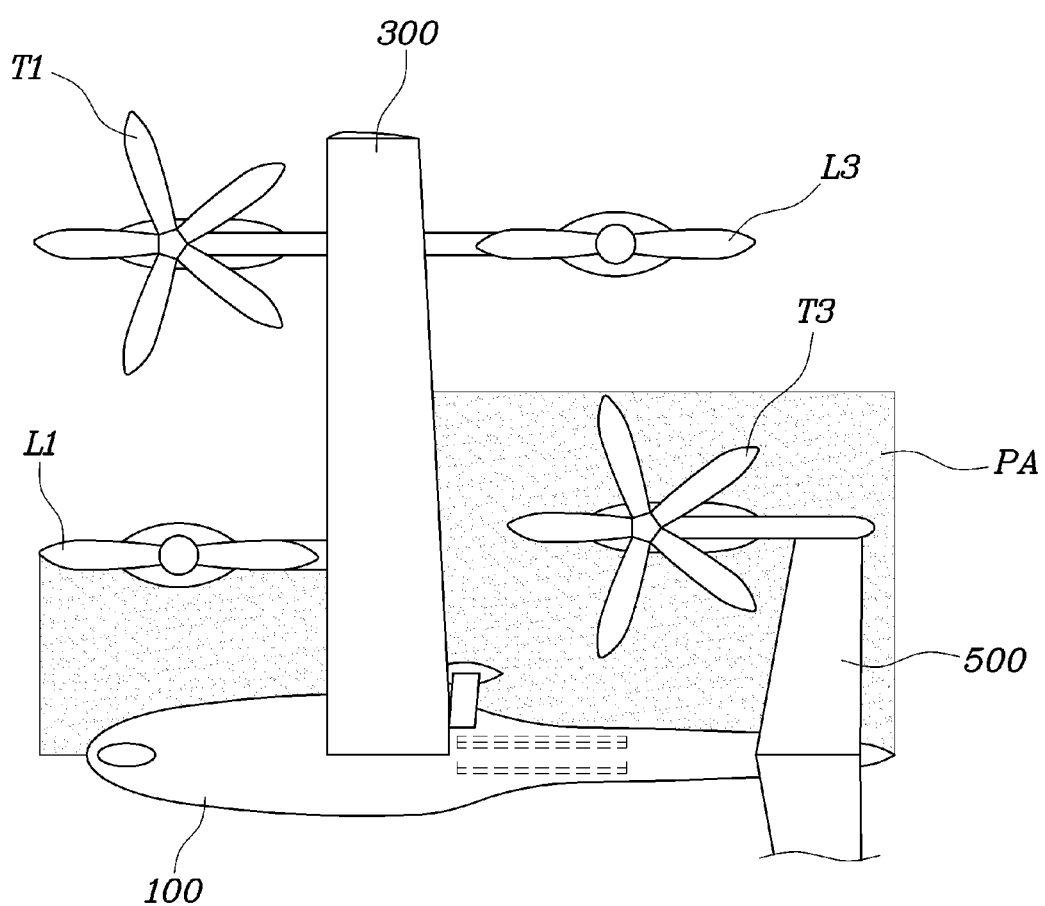
FIG. 5 is a view showing a close space of the takeoff and landing air mobility according to the exemplary embodiment of the present disclosure.

As a result, as shown in box parts of FIG. 5, the close space PA is provided very wide at a position between the lifting rotor L1 on the main wing and the fuselage 100, and at a position below the tilting rotor T3 of the tail wing 500. Therefore, through the close area PA which is wide, passengers may reach the fuselage conveniently and safely to enter and exit. In addition, at least one or more lifting rotors among the lifting rotors L1 to L4 may be a two-lobed propeller type. The lifting rotors L1 to L4 may be stopped to maximally reduce flight resistance when not in operation. In particular, the lifting rotors L1 to L4 may be stopped to maximally reduce the flight resistance during cruising.

In addition, the lifting rotors L1 to L4 may be stopped to maximally reduce flight resistance when not in operation, and may be aligned in a direction parallel to a flight direction. Particularly, the lifting rotors L1 to L4 are rotors necessary only for vertical takeoff and landing of the fuselage. Therefore, when cruising the fuselage 100, stopping the lifting rotors L1 to L4 from operation may effectively reduce flight resistance. Furthermore, when stopping the lifting rotors L1 to L4 from operation, fuel efficiency may be improved by operating the rotors so that the propeller direction of the lifting rotors L1 to L4 is aligned in parallel to the direction in which the fuselage is flying to maximally reduce flight resistance.

Therefore, align the propellers in parallel, the propellers of the lifting rotors L1 to L4 may be a two-lobed propeller type, which is provided with each propeller on both sides relative to the center of rotation. Accordingly, the propellers of the lifting rotors L1 to L4 become a straight-line shape, and as a result, when not in use, the propellers of the lifting rotors L1 to L4 may be aligned in parallel to the flight direction. However, the number of propellers may be insufficient, causing insufficient propulsion force. Therefore, as shown in FIGS. 1 to 4, in the case of the two-lobed propeller type rotors among the lifting rotors L1 to L4, doubling the propulsion force may be necessary by providing two propellers, one as an upper propeller UP and the other as a lower propeller LP.

As previously described, the main wing 300 may include two tilting rotors T1 and T2 and two or more lifting rotors L1 and L2, and the tilting rotors T1 and T2 may be disposed at both of the outermost sides of the main wing 300. Particularly, two tilting rotors T1 and T2 and four lifting rotors L1 to L4 may be provided on the main wing 300, and two tilting rotors T1 and T2 and two lifting rotors L1 and L2 (e.g., a first pair) may be disposed at the front side of the main wing 300, and the other two lifting rotors L3 and L4 (e.g., a second pair) may be disposed at the rear side of the main wing 300. In addition, the two tilting rotors T1 and T2 and the two lifting rotors L3 and L4 (e.g., the second pair of lifting rotors) disposed on the rear side of the main wing 300 may be disposed on both of the outermost sides of the main wing 300 to allow cruising in a state with balance control even when any rotor fails.

In addition, two tilting rotors T3 and T4 may be disposed on the tail wing 500. Two tilting rotors T3 and T4 provided on the tail wing 500 are disposed at positions upwardly apart from the fuselage 100 to secure the close space for entering and exiting and to prevent a phenomenon, in which noise and/or vibration is directly transmitted to the fuselage. To implement this, as shown in the exemplary embodiment of FIG. 4, the tail wing 500 may be extended to be inclined upward from the upper part of the fuselage 100, and the tilting rotors T3 and T4 may be provided at the outermost sides of the tail wing 500. Accordingly, the tilting rotors T3 and T4 of the tail wing 500 may be disposed at positions above the fuselage 100.

Meanwhile, the wings may include the main wing 300 and the tail wing 500 which is shorter in length than the main wing 300. In front of the main wing 300, the two tilting rotors T1 and T2 (e.g., a first pair) and the two lifting rotors L1 and L2 (e.g., the first pair) may be disposed to be horizontally aligned. Two lifting rotors L3 and L4 (e.g., the second pair) may be disposed at the rear of the main wing 300, and two tilting rotors T3 and T4 (e.g., a second pair) may be disposed at the tail wing 500. The lifting rotors L3 and L4 at the rear of the main wing 300 and the tilting rotors T3 and T4 of the tail wing 500 may be disposed to be horizontally aligned. In addition, the tilting rotors T1 and T2 of the main wing 300 may be disposed on the outermost sides of the main wing 300. The tilting rotors T3 and T4 of the tail wing 500 may be respectively disposed at a position between the fuselage 100 and the lifting rotors L3 at the rear of the main wing 300, and a position between the fuselage 100 and the lifting rotors L4 at the rear of the main wing 300. Through this disposition structure, a balance control may be possible during both lifting and cruising.

In particular, as shown in FIG. 4, the lifting rotors L1 to L4 may include the close lifting rotors L1 and L2 provided in close proximity to the fuselage and distant lifting rotors L3 and L4 provided to be distant from the fuselage. The close lifting rotors L1 to L4 may include propellers that may be inclined so that a side of the close lifting rotors close to the fuselage 100 faces upward. In other words, the passengers P may enter and exit at a position close to the fuselage, and thus, a part close or proximate to the fuselage 100 needs to secure the headroom for the passengers P. Accordingly, the close lifting rotors L1 and L2 are designed such that the propellers are inclined so that the side of the close lifting rotors close to the fuselage 100 faces upward.

Accordingly, the boarding gate may be disposed on a side of the fuselage 100, and the boarding gate is disposed on the side rather than the front or the rear, thus easing the entering and exiting for all passengers in a boarding circumstance with numerous passengers, as if the fuselage were a Van-type vehicle. In addition, through this configuration, as shown in FIG. 5, the close space PA that enables the passengers to reach the boarding gate may be formed through the lower space of the tilting rotors T3 and T4, and through the lower space of the lifting rotors L1 and L2 which are disposed in close proximity to the fuselage 100.

Figure 6:
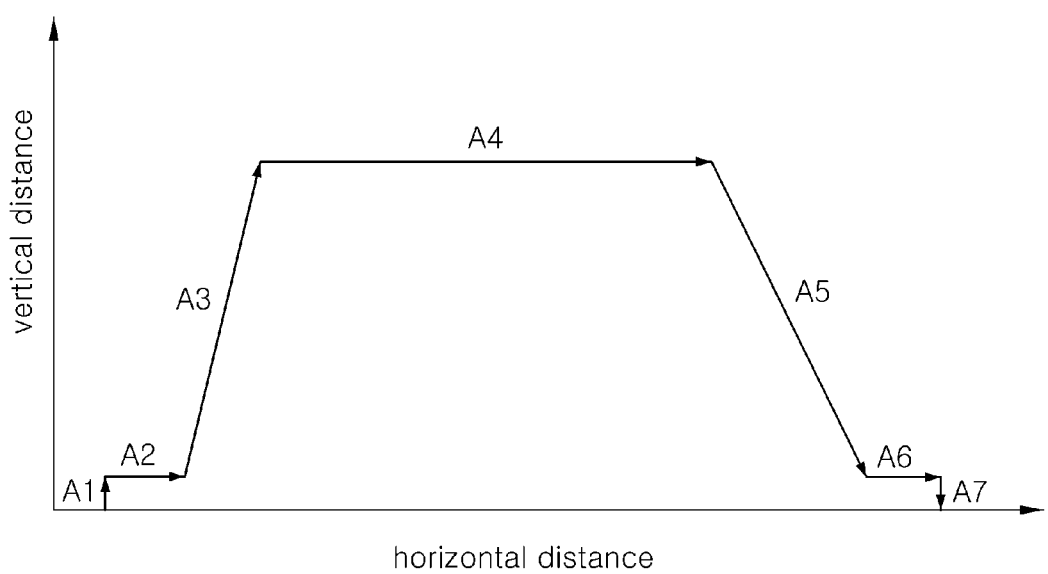
FIG. 6 is a graph showing a flight plan of the takeoff and landing air mobility according to the exemplary embodiment of the present disclosure.

For reference, FIG. 6 shows a flight plan of the air mobility according to the exemplary embodiment of the present disclosure. In the case of FIG. 6, the horizontal axis of the graph refers to a horizontal distance, and the vertical axis thereof refers to a vertical distance. First, in a boarding stage, the air mobility craft has no disposition of a rotor at a position in the center rear of the main wing, and the rotors mounted on the tail wing are positioned higher than the main wing, thereby providing sufficient boarding space. In addition, while the passengers are boarding, the tilting rotors are tilted upward to be level to the ground, thereby securing the height of the boarding space (e.g., headroom) for the passengers.

After the passengers are on board, the tilting rotors of the air mobility may be aligned horizontally to be switched into a lifting mode. Accordingly, both lifting rotors and tilting rotors may be operated for the air mobility craft to generate sufficient lift for lifting. Consequently, the air mobility rises vertically and takes off (i.e., hover and takeoff as in A1). Accordingly, after flying to or reaching a particular height, the air mobility craft may be configured to perform air traffic control communication, and flies into the transition stage (i.e., transition as in A3), in which the air mobility rises to a flight altitude and simultaneously moves forward for a full-fledged flight. At this time, the four tilting rotors start tilting downward, and lift may be generated by the main wing according to the forward speed. The four lifting rotors may be operated so that the sum of lift by the main wing and lift by the lifting rotors corresponds to the lift required by the air mobility. When lift by the main wing is able to meet all the lift required by the air mobility, the lifting rotors may be stopped, and particularly, may be stopped to be aligned in the same direction as the flight direction to maximally reduce flight resistance.

Afterward, during cruising (i.e., cruise as in A4), the lifting rotors may be stopped and aligned to be in parallel to the flight direction to maximally reduce the flight resistance, and two or more tilting rotors may be operated to generate propulsion force for forward flight. In addition, after passing through the transition stage (i.e., transition as in A5), in which the air mobility craft goes down again near the destination, the air mobility craft may move by a particular distance (i.e., in A6) and perform vertical landing (i.e., hover and landing as in A7).

In particular, in the transition stage, the vertical movement and the horizontal movement are mixed. A calculation of lift is important, and supplementary lift that is necessary may be obtained through the calculation or measurement of the lift, and thus the lifting rotors may be operated to correspond to the calculated lift. In other words, when the tilting rotors only adjust the degree of tilting without adjusting the speed, adjusting the speed by the lifting rotors is necessary in the transition stage. Meanwhile, when adjusting lift itself is necessary, the tilting rotors are required to adjust the speed.

According to the vertical takeoff and landing air mobility of the present disclosure, the vertical takeoff and landing air mobility is capable of taking off and landing vertically, and by effectively disposing a plurality of rotors, the vertical takeoff and landing air mobility is capable of responding to a failure of some rotors, effectively reducing noise and/or vibration, and increasing boarding convenience.

Although an exemplary embodiment of the present disclosure has been described for illustrative purposes, those skilled in the art will appreciate that various modifications, additions and substitutions are possible, without departing from the technical scope and spirit of the disclosure as disclosed in the accompanying claims.

What is claimed is:

1. An air mobility craft, comprising:
a fuselage having a boarding space and a boarding gate;
a plurality of wings disposed on the fuselage; and
a rotor unit including a plurality of rotors disposed on the wings, wherein a first number of the plurality of rotors are tilting rotors configured to tilt upward or downward for lifting or cruising of the fuselage, and a remaining number of the rotors are lifting rotors for the lifting of the fuselage,
wherein the tilting rotors include at least four or more rotors, at least two or more tilting rotors being respectively disposed on a left side and a right side relative to a center of the fuselage,
wherein the wings include a main wing and a tail wing;
wherein the main wing includes two tilting rotors and four lifting rotors, and the two tilting rotors on the main wing and a first pair of lifting rotors are disposed at a first side of the main wing, and a second pair of lifting rotors are disposed at a rear side of the main wing;
wherein the two tilting rotors and the second pair of lifting rotors disposed on the rear side of the main wing are disposed on both of the outermost sides of the main wing; and
the tail wing includes two tilting rotors and the two tilting rotors on the tail wing and the second pair of lifting rotors are aligned in a lateral direction.

2. The air mobility craft of claim 1, wherein the tilting rotors include an even number of rotors, and a same number thereof are respectively disposed on the left side and the right side relative to the center of the fuselage.

3. The air mobility craft of claim 1, wherein the lifting rotors include at least four or more rotors, and at least two or more lifting rotors are respectively disposed on the left side and the right side relative to the center of the fuselage.

4. The air mobility craft of claim 1, wherein the tilting rotors include close tilting rotors disposed in close proximity to the fuselage, and distant tilting rotors disposed to be distant from the fuselage, and the close tilting rotors are disposed at positions upwardly apart from the fuselage.

5. The air mobility craft of claim 1, wherein at least one or more rotors among the lifting rotors are a two-lobed propeller type.

6. The air mobility craft of claim 1, wherein the lifting rotors are stopped to maximally reduce flight resistance when not in operation.

7. The air mobility craft of claim 1, wherein the lifting rotors are stopped to maximally reduce the flight resistance during the cruising.

8. The air mobility craft of claim 5, wherein the lifting rotors are stopped to maximally reduce the flight resistance when not in operation, and are aligned in a direction parallel to a flight direction.

9. The air mobility craft of claim 5, wherein for the two-lobed propeller type of the lifting rotors, two propellers are provided, a first propeller as an upper part propeller and a second propeller as a lower part propeller.

10. The air mobility craft of claim 1, wherein the two tilting rotors disposed on the tail wing are disposed at positions upwardly apart from the fuselage.

11. The air mobility craft of claim 1, wherein the tail wing extends upwardly inclined from an upper part of the fuselage and the tilting rotors are disposed on outermost sides of the tail wing.

12. The air mobility craft of claim 1, wherein the lifting rotors include close lifting rotors disposed in close proximity to the fuselage and distant lifting rotors disposed to be distant from the fuselage, and the close lifting rotors include propellers inclined so that a side of the close lifting rotors proximate to the fuselage faces upward.

13. The air mobility craft of claim 1, wherein the boarding gate is disposed on a side of the fuselage, and this disposition structure forms a closed space for passengers to reach the boarding gate through a lower space of the lifting rotors disposed proximate to the fuselage and the tilting rotors.

14. An air mobility craft, comprising:
a fuselage having a boarding space and a boarding gate;
a plurality of wings disposed on the fuselage; and
a rotor unit including a plurality of rotors disposed on the wings,
wherein a first number of the plurality of rotors are configured to tilt upward or downward for lifting or cruising of the fuselage, and a remaining number of the rotors are lifting rotors for the lifting of the fuselage,
wherein the tilting rotors include at least four or more rotors, at least two or more tilting rotors being respectively disposed on a left side and a right side relative to a center of the fuselage,
wherein the lifting rotors include two or more rotors; and
wherein the wings include a main wing and a tail wing which is shorter in length than the main wing, wherein a first pair of tilting rotors and a first pair of lifting rotors are disposed to be aligned in a lateral direction in front of the main wing, a second pair of lifting rotors are disposed at a rear of the main wing, and a second pair of two tilting rotors are disposed on the tail wing, and wherein the second pair of lifting rotors at the rear of the main wing and the second pair of tilting rotors of the tail wing are disposed to be aligned in a lateral direction.

15. The air mobility craft of claim 14, wherein the first pair of tilting rotors of the main wing are disposed on outermost sides of the main wing, and the second pair of tilting rotors of the tail wing are disposed at positions between the fuselage and the second pair of lifting rotors on the rear of the main wing.

* * * * *